(12) United States Patent
Dunne

(10) Patent No.: US 12,026,259 B2
(45) Date of Patent: Jul. 2, 2024

(54) METHOD AND SYSTEM FOR SECURELY PROVISIONING ELECTRONIC DEVICES

(71) Applicant: Secure Thingz Ltd., Cambridge (GB)

(72) Inventor: Peter Dunne, Huntingdon (GB)

(73) Assignee: SECURE THINGZ LTD., Cambridge (GB)

(*) Notice: Subject to any disclaimer, the term of this patent is extended or adjusted under 35 U.S.C. 154(b) by 215 days.

(21) Appl. No.: 17/696,048

(22) Filed: Mar. 16, 2022

(65) Prior Publication Data
US 2022/0300613 A1    Sep. 22, 2022

(30) Foreign Application Priority Data
Mar. 17, 2021 (EP) .................................. 21163097

(51) Int. Cl.
*G06F 21/57* (2013.01)
*H04L 9/08* (2006.01)

(52) U.S. Cl.
CPC ............ *G06F 21/57* (2013.01); *H04L 9/0861* (2013.01); *G06F 2221/034* (2013.01)

(58) Field of Classification Search
CPC ... G06F 21/57; G06F 2221/034; H04L 9/0861
See application file for complete search history.

(56) References Cited

U.S. PATENT DOCUMENTS

| | | | |
|---|---|---|---|
| 9,479,328 B1 | 10/2016 | Wilburn et al. | |
| 10,454,674 B1* | 10/2019 | Bar-El | H04L 63/123 |
| 11,424,920 B2* | 8/2022 | Bursell | H04L 9/0861 |
| 2009/0268902 A1 | 10/2009 | Fascenda et al. | |
| 2014/0195807 A1 | 7/2014 | Bar-El et al. | |
| 2017/0288869 A1 | 10/2017 | Li et al. | |
| 2020/0125742 A1* | 4/2020 | Kounavis | G06F 21/72 |
| 2020/0228315 A1* | 7/2020 | Fiske | H04L 9/0891 |
| 2021/0141902 A1* | 5/2021 | Martel | G06F 21/57 |
| 2022/0271927 A1* | 8/2022 | Stayskal | H04L 9/0877 |
| 2022/0284112 A1* | 9/2022 | Seader | G06F 21/606 |
| 2023/0027329 A1* | 1/2023 | Durham | H04L 9/0631 |

FOREIGN PATENT DOCUMENTS

EP    3525391 A1    8/2019

OTHER PUBLICATIONS

Extended Search Report from corresponding EP Application No. EP21163097.5 dated Aug. 16, 2021.

* cited by examiner

*Primary Examiner* — Kristie D Shingles
(74) *Attorney, Agent, or Firm* — Workman Nydegger

(57) ABSTRACT

A method for provisioning a plurality of electronic devices with a respective provisioning data set includes, in a test provisioning stage: generating at least one test application key in plaintext and encrypting the at least one test application key using a first wrapping key for generating at least one encrypted test application key; encrypting the first wrapping key using the secret device master key for generating an encrypted first wrapping key; provisioning one or more of the plurality of electronic devices with a respective first provisioning data set, wherein the respective first provisioning data set comprises the at least one test application key in plaintext, the at least one encrypted test application key and the encrypted first wrapping key; and testing a security function of the electronic device on the basis of at least a portion of the first provisioning data set.

20 Claims, 6 Drawing Sheets

METHOD AND SYSTEM FOR SECURELY PROVISIONING ELECTRONIC DEVICES

TECHNICAL FIELD

The invention relates to the secure production and provisioning of devices. More specifically, the invention relates to a method and system for securely provisioning electronic devices.

BACKGROUND OF THE INVENTION

The production and assembly of state-of-the-art electronic consumer equipment, such as smartphones, tablet computers as well as other types of IoT devices, often happens in a distributed fashion in that the various electronic components or devices, including the electronic chips or microprocessors of the electronic consumer equipment are manufactured, provisioned or personalized and finally assembled at different locations and by different parties. For instance, an electronic chip or microprocessor for an electronic consumer equipment may be originally manufactured by a chip manufacturer (also known as "silicon vendor") and provisioned by another party with personalized provisioning data, before being assembled into the final end product by the manufacturer of the electronic consumer equipment, e.g., an OEM (Original Equipment Manufacturer).

Often the personalized provisioning data includes firmware, software applications or other types of program code of the OEM as well as one or more personalized cryptographic keys, such as RSA private/public key pairs or ECC-type keys, which are unique for each electronic device to be provisioned. However, before the actual production of electronics devices for the OEM, i.e., the provisioning of the electronics devices with personalized provisioning data, the provisioning process must usually be tested to work correctly. Generally, this testing phase is done by the OEM.

For such distributed processing chains of electronic equipment there is a need for apparatuses, methods allowing for a secure and controlled provisioning of electronic components or devices, such as chips or microprocessors of the electronic equipment.

SUMMARY OF THE INVENTION

It is therefore an object of the invention to provide apparatuses, systems and methods allowing for a secure and controlled provisioning of electronic devices, such as chips or microprocessors for electronic equipment.

The foregoing and other objects are achieved by the subject matter of the independent claims. Further implementation forms are apparent from the dependent claims, the description and the figures.

According to a first aspect of the invention a method for provisioning a plurality of electronic devices with a respective personalized provisioning data set is provided. Each electronic device comprises a hardware security enclave providing a secret device master key. The electronic devices may comprise chips, microprocessors or other programmable electronic components, such as Flash memories, electrically erasable programmable read only memories (EEPROM), programmable logic devices (PLDs), field programmable gate arrays (FPGAs), and microcontrollers incorporating non-volatile memory elements.

The method comprises, in a test provisioning stage, i.e., in a stage where the provisioning of the electronic devices is developed and tested, the following steps:

generating at least one test application key in plaintext and encrypting, i.e., wrapping the at least one test application key using a first wrapping key for generating at least one encrypted, i.e., wrapped test application key;

encrypting, i.e., wrapping the first wrapping key using the secret device master key for generating an encrypted, i.e., wrapped first wrapping key;

provisioning one or more of the plurality of electronic devices with a respective first provisioning data set, wherein the respective first provisioning data set comprises the at least one test application key in plaintext, the at least one encrypted test application key, i.e., the at least one wrapped test application key and the encrypted, i.e., wrapped first wrapping key; and testing a security function of the electronic device on the basis of at least a portion of the first provisioning data set, e.g., the plaintext and/or wrapped test application key, for instance, for debugging the electronic device and/or the first provisioning data set.

In an embodiment, the first provisioning data set further comprises data encrypted with the at least one test application key in plaintext.

In an embodiment, in a production provisioning stage, i.e., in a stage where the electronic devices are provisioned for production, the method further comprises the steps of:

generating at least one application key in plaintext and encrypting, i.e., wrapping the at least one application key using a second wrapping key for generating at least one encrypted, i.e., wrapped application key;

encrypting, i.e., wrapping the second wrapping key using the secret device master key for generating an encrypted, i.e., wrapped second wrapping key;

provisioning one or more of the plurality of electronic devices with a respective second provisioning data set, wherein the respective second provisioning data set comprises the at least one encrypted, i.e., wrapped application key and the encrypted, i.e., wrapped second wrapping key.

In an embodiment, the second provisioning data set further comprises data encrypted with the at least one application key in plaintext.

In an embodiment, the at least one test application key has a first key entropy and the at least one application key has a second key entropy, wherein the first key entropy is substantially, e.g., by many orders of magnitude smaller than the second key entropy.

In an embodiment, the at least one test application key has a first key size, i.e., key length and the at least one application key has a second key size, i.e., key length, wherein the first key size is equal to the second key size.

In an embodiment, the method comprises, in the test provisioning stage, generating the at least one test application key in plaintext based on a key generation mechanism and, in the production provisioning stage, generating the at least one application key based on the same key generation mechanism.

In an embodiment, the method comprises, in the test provisioning stage, generating the at least one test application key using a first set of random seed numbers and, in the production provisioning stage, generating the at least one application key using a second set of random seed numbers, wherein the entropy of the first set of random numbers is smaller than the entropy of the second set of random numbers.

In an embodiment, the second set of random numbers comprises substantially more random numbers than the first set of random numbers. In the case of the test application key used during the test provisioning stage, the first set of random numbers may be used to choose a key value from a set of predetermined key values which are fixed. Here, the randomness comes from randomly choosing a fixed key value from a set of maybe 16 numbers. Alternatively, for some applications there may only be a single, fixed number of keys be defined. In the case of the application key used during the production provisioning stage the second set of random numbers may be random numbers for the entire key. In this case, there could be up to 2 to the power 256 possible random numbers, i.e., much more than only 16 numbers.

In an embodiment, the method further comprises the step of decrypting the encrypted second wrapping key on the basis of the device master key and the step of decrypting the at least one encrypted application key using the second wrapping key for retrieving the at least one application key.

In an embodiment, the method further comprises storing the at least one application key in the hardware security enclave of the electronic device.

In an embodiment, the first wrapping key (used for wrapping the at least one application test key for the test provisioning stage) and the second wrapping key (used for wrapping the at least one application key for the production provisioning stage) have the same or substantially the same key entropy.

In an embodiment, the first wrapping key has the same key bit length as the second wrapping key.

In an embodiment, the method further comprises, in the production provisioning stage, transmitting the respective second provisioning data set from a production provisioning control apparatus to a production provisioning equipment server.

In an embodiment, the method comprises, in the production provisioning stage, transmitting the respective second provisioning data set towards the provisioning equipment server via a wired connection.

According to a second aspect the invention relates to a provisioning control system implementing the method according to the first aspect. The provisioning control system may comprise a production provisioning control apparatus and a production provisioning equipment server being electrically connectable with a plurality of electronic devices for provisioning the plurality of electronic devices with a respective personalized provisioning data set, wherein the production provisioning control apparatus is coupled to the production provisioning equipment server for controlling the provisioning of the one or more electronic devices.

Embodiments of the invention can be implemented in hardware and/or software.

BRIEF DESCRIPTION OF THE DRAWINGS

Further embodiments of the invention will be described with respect to the following figures, wherein.

In the figures, identical reference signs will be used for identical or at least functionally equivalent features.

DETAILED DESCRIPTION OF EMBODIMENTS

In the following detailed description, reference is made to the accompanying drawings, which form part of the disclosure, and in which are shown, by way of illustration, specific aspects in which the present invention may be implemented. It is understood that other aspects may be utilized and structural or logical changes may be made without departing from the scope of the present invention. The following detailed description, therefore, is not to be taken in a limiting sense, as the scope of the present invention is defined by the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
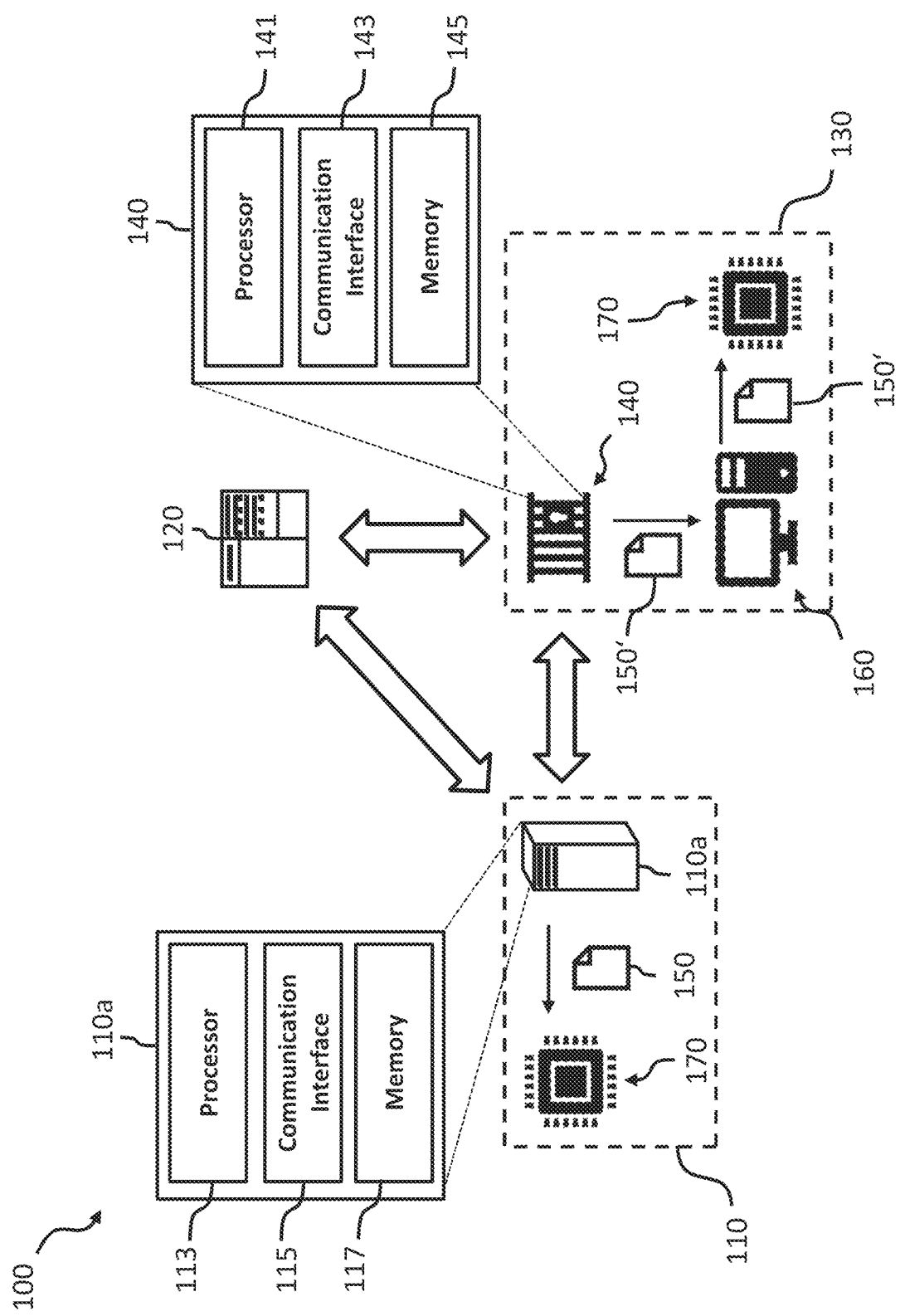
FIG. 1 shows a schematic diagram illustrating a provisioning system according to an embodiment of the invention implementing a provisioning method according to an embodiment of the invention.

FIG. 1 shows a schematic diagram of a provisioning system 100 according to an embodiment of the invention. As will be described in more detail further below, the provisioning system 100 may comprise in addition to a production provisioning control apparatus 140 a remote server 110a, a token generator server 120 and a production provisioning equipment server 160 for provisioning or personalizing electronic devices 170, such as chips or microprocessors 170 with a respective personalized provisioning data set 150'. In an embodiment, the remote server 110 may comprise or implement a development provisioning apparatus 110a for testing and developing the provisioning of the electronic devices 170 with a respective personalized provisioning data set 150. In an embodiment, the remote server 110a may be operated by the electronic equipment manufacturer, i.e., the OEM as a part of a testing and developing environment 110 of the OEM. As illustrated in FIG. 1, the development provisioning apparatus 110a may comprise a processor 113, a communication interface 115 and a memory 117.

Under further reference to FIG. 2 and as will be described in more detail below, the provisioning control system 100 of FIG. 1 may implement a method for provisioning the plurality of electronic devices 170 with a respective provisioning data set 150, 150'.

As illustrated in FIG. 1, the production provisioning control apparatus 140, the remote server 110a and the token generator server 120 may be configured to communicate with each other via a communication network, such as the Internet. Thus, the production provisioning control apparatus 140, the remote server 110 and the token generator server 120 may be at different locations and under the control of different parties. As illustrated in FIG. 1, the production provisioning control apparatus 140 and the production provisioning equipment server 160 may be located within a production environment 130, such as a personalization factory 130. As already mentioned above, the remote server 110 implementing the development provisioning apparatus 110a may be under the control or associated with an electronic equipment manufacturer, e.g. an OEM, wherein the electronic equipment manufacturer assembles electronic equipment, such as smartphones, tablet computers or other types of IoT or electronic consumer equipment, using the electronic devices 170 provisioned by the production provisioning equipment server 160 with the respective personalized provisioning data set 150. In an embodiment, the respective personalized provisioning data set 150 may comprise a firmware or software application of the electronic equipment manufacturer associated with the remote server 110. Advantageously, this allows the electronic equipment manufacturer to have control over the provisioning of the electronic devices with its firmware or software applications.

In an embodiment, the production provisioning control apparatus 140, the remote server 110 and the token generator server 120 are configured to securely communicate with each other using one or more cryptographic schemes, such as a public key infrastructure and/or a hybrid cryptographic scheme.

The production provisioning control apparatus 140 is configured to be coupled to the provisioning equipment server 160, for instance, by a wired or a wireless connection. In an embodiment, the production provisioning equipment server 160 may be implemented as a personal computer and the production provisioning control apparatus 140 may be implemented as a PC card inserted in the production provisioning equipment server 160. The production provisioning equipment server 160 may comprise an electrical and/or mechanical interface for interacting directly or indirectly via a provisioning equipment with the electronic devices 170. For instance, the production provisioning equipment server 160 may comprise a personalization tray for personalizing a batch of electronic devices 170 inserted therein.

In the embodiment illustrated in FIG. 1 the production provisioning control apparatus 140 comprises a processor 141, a communication interface 143 and a non-transient memory 145. The communication interface 143 is configured to transmit the plurality of personalized provisioning data sets 150' to the production provisioning equipment server 160.

Figure 2:
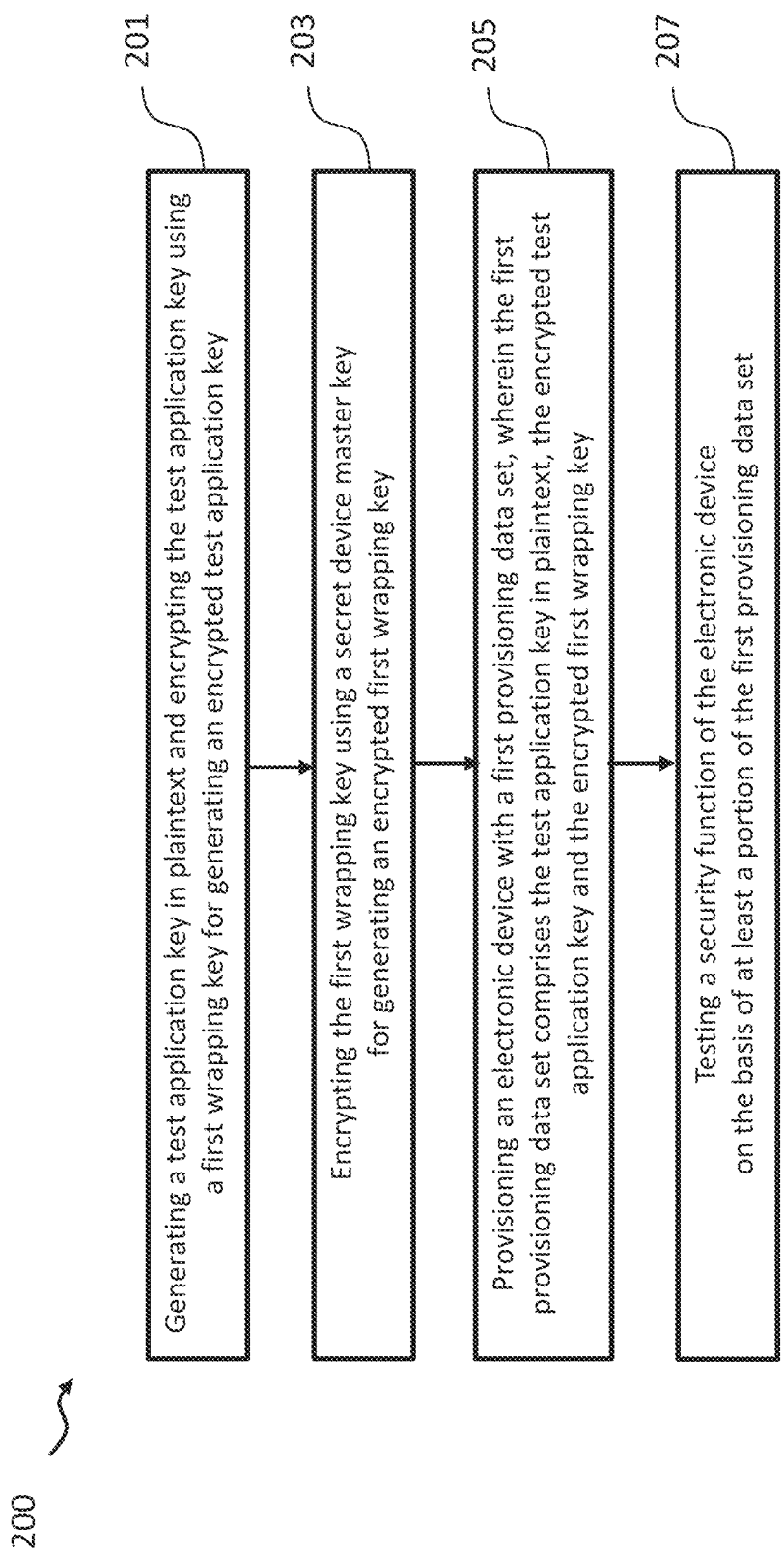
FIG. 2 shows a flow diagram illustrating a provisioning method according to an embodiment.
Figure 3A:
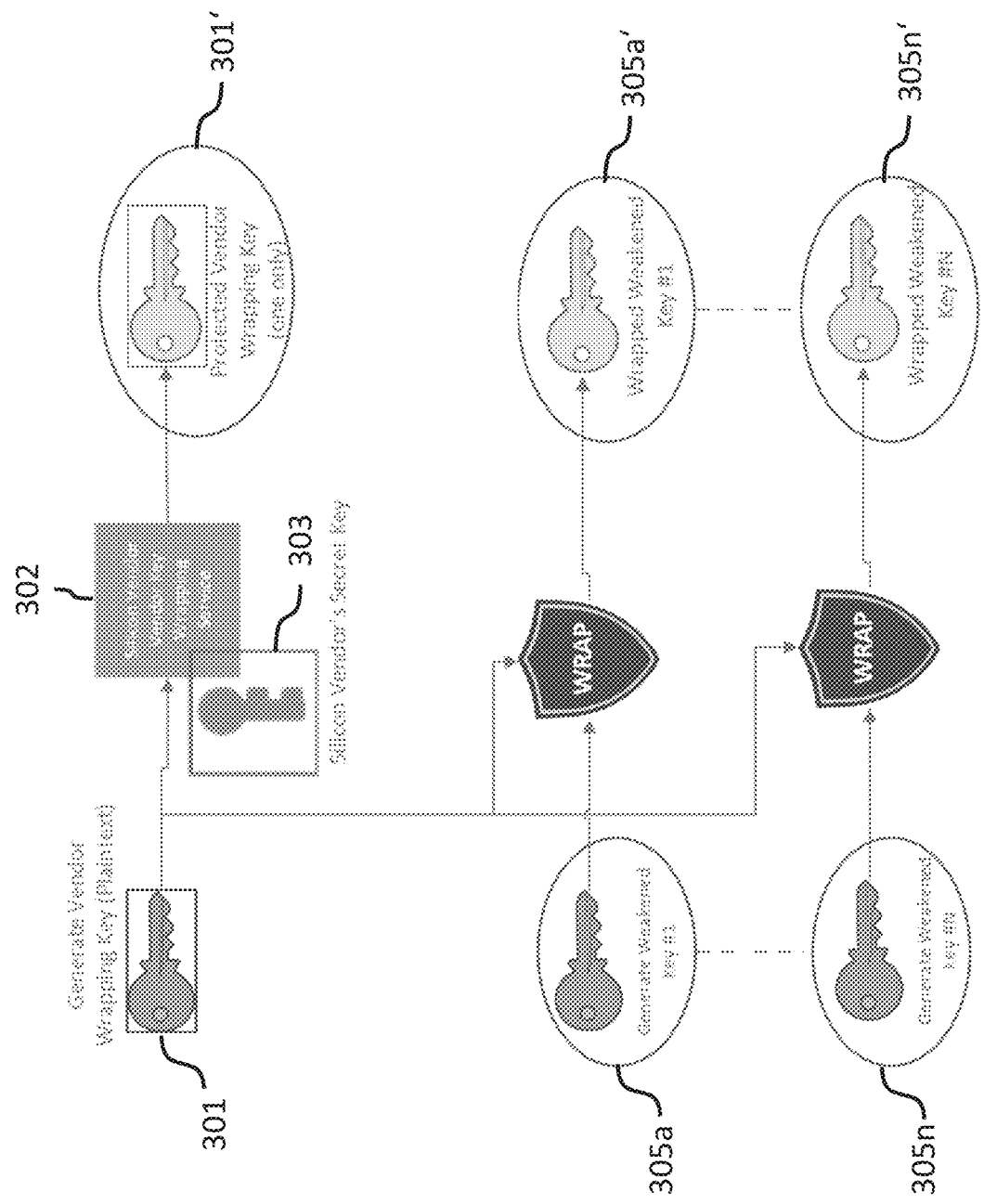
FIG. 3a shows a schematic diagram illustrating the generation of keys during a test provisioning stage of a method according to an embodiment.
Figure 3B:
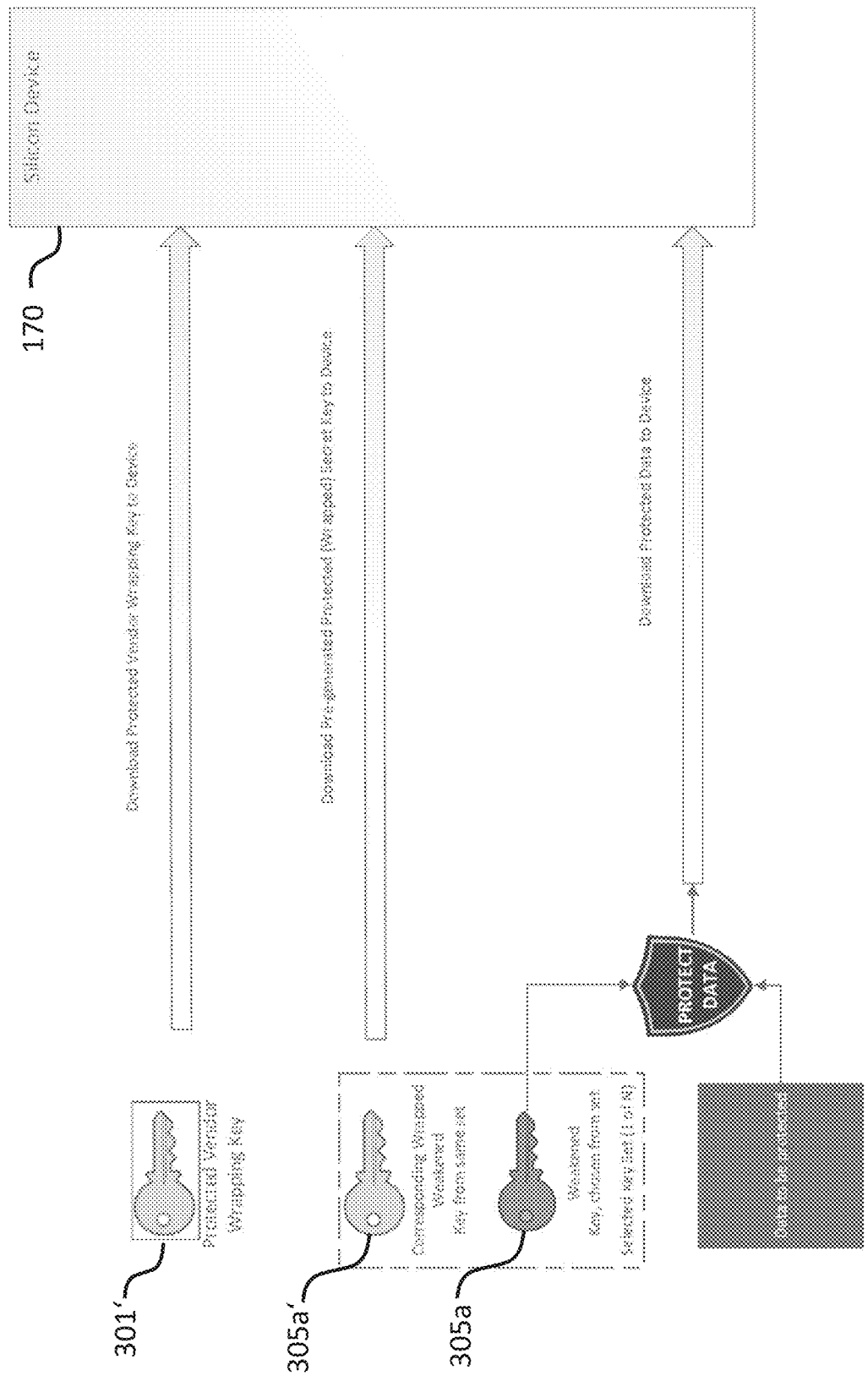
FIG. 3b shows a schematic diagram illustrating the provisioning of an electronic device during a test provisioning stage of a method according to an embodiment.
Figure 4A:
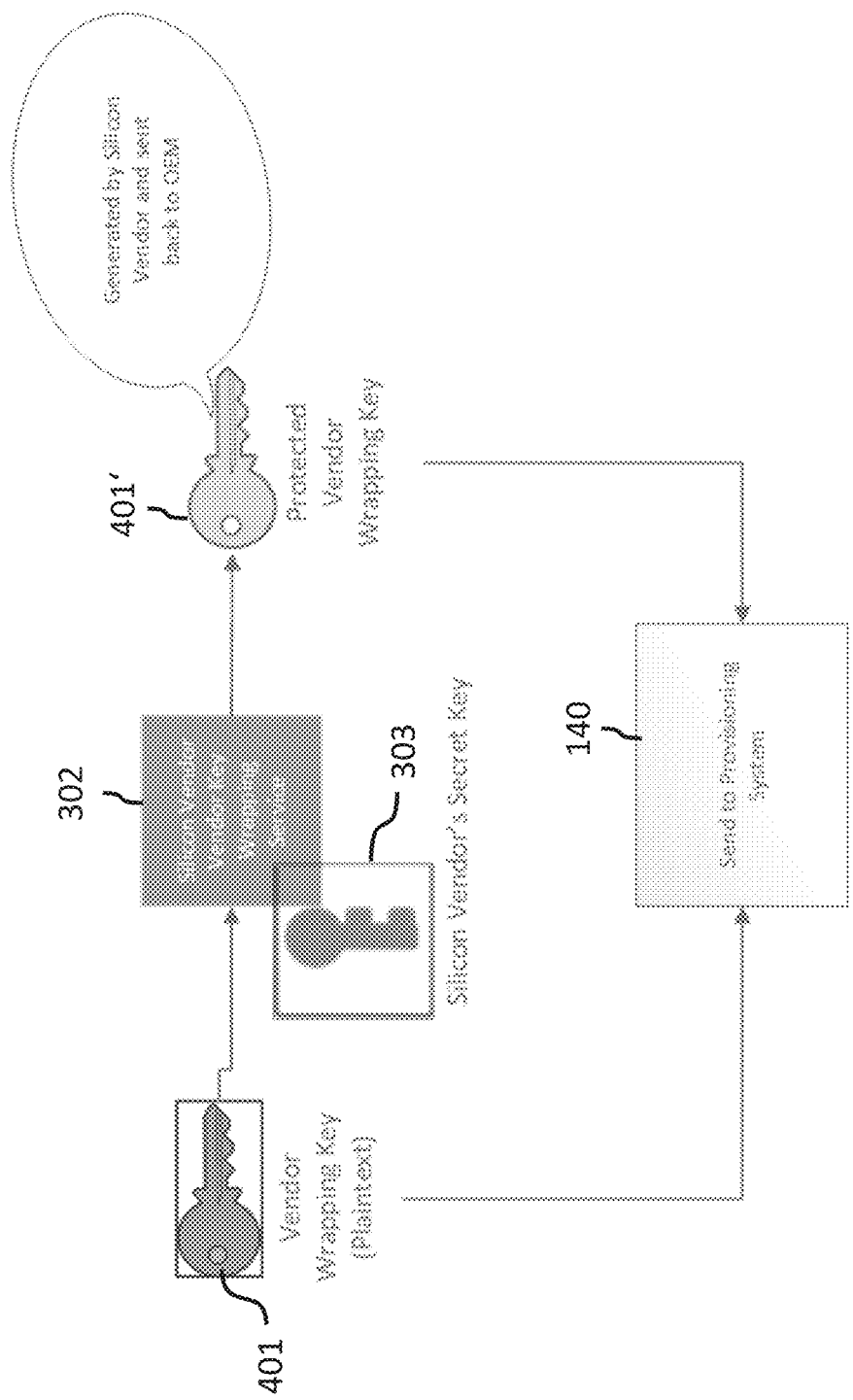
FIG. 4a shows a schematic diagram illustrating the generation of keys during a production provisioning stage of a method according to an embodiment.
Figure 4B:
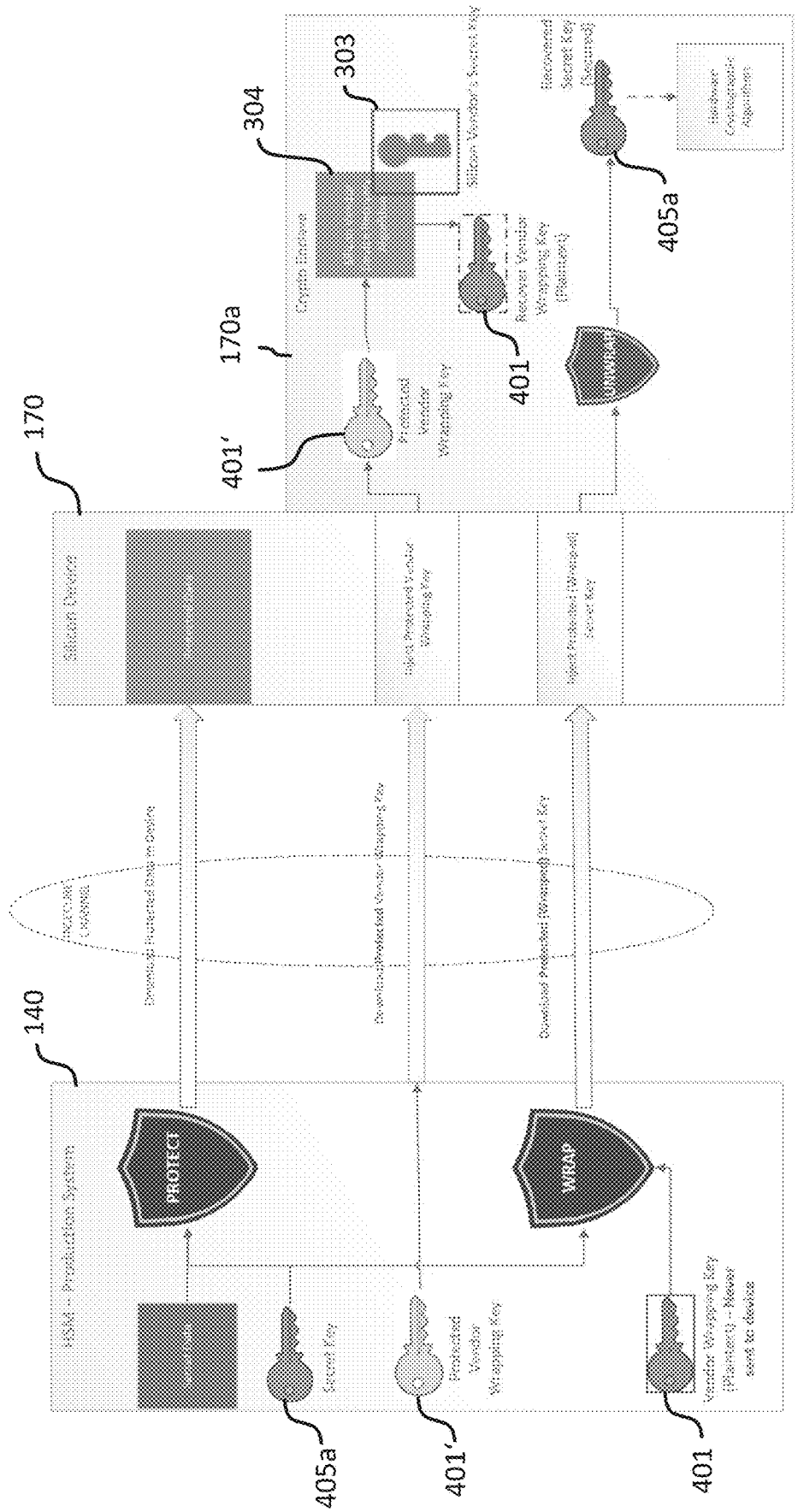
FIG. 4b shows a schematic diagram illustrating the provisioning of an electronic device during a production provisioning stage of a method according to an embodiment.

FIG. 2 shows a flow diagram illustrating a provisioning method 200 according to an embodiment implemented within the provisioning system 100 shown in FIG. 1. Further embodiments of the provisioning method shown in FIG. 2 will be described in the following under further reference to FIGS. 3a, 3b and 4a, 4b. FIGS. 3a and 3b illustrate the generation of keys and the provisioning of an electronic device during a test provisioning stage of the provisioning method 200 according to an embodiment, whiles FIGS. 4a and 4b illustrate the generation of keys and the provisioning of an electronic device during a production provisioning stage of the provisioning method 200 according to an embodiment.

As already described above, the method 200 shown in FIG. 2 allows provisioning the electronic devices 170 with a respective provisioning data set 150, 150' during a test provisioning stage and during a production provisioning stage. As illustrated in FIG. 4b, each electronic device 170 comprises a hardware security enclave 170a (also referred to as "crypto enclave") providing a secret device master key 303. The hardware security enclave 170a of the electronic device 170 may comprise or be similar to the security enclave processor as disclosed in U.S. Pat. No. 8,832,465, which is herein fully incorporated by reference.

As illustrated in FIGS. 2 and 3a, the provisioning method 200 comprises in the test provisioning stage a first step 201 of generating at least one test application key 305a-n in plaintext and encrypting, i.e. wrapping the at least one test application key 305a-n using a first wrapping key 301 (referred to as "vendor wrapping key" in FIG. 3a) for generating at least one encrypted test application key 305a'-n'. Moreover, as illustrated in FIGS. 2 and 3a, the provisioning method 200 comprises in the test provisioning stage a further step 203 of encrypting, i.e., wrapping the first wrapping key 301 using the secret device master key 303 for generating an encrypted first wrapping key 301'. This wrapping of the first wrapping key 301 using the secret device master key 303 may be provided by a wrapping service 302 of the manufacturer of the electronic device 170, i.e., the silicon vendor.

As illustrated in FIG. 2, in the test provisioning stage the provisioning method 200 comprises a further step 205 of provisioning one or more of the plurality of electronic devices 170 (referred to as "silicon device" in FIG. 3b) with a respective first provisioning data set 150, wherein the respective first provisioning data set 150 comprises the at least one test application key 305a-n in plaintext, the at least one encrypted test application key 305a'-n' and the encrypted first wrapping key 301' (also illustrated in FIG. 3b). As illustrated in FIG. 3b, in an embodiment, the first provisioning data set 150 may further comprise data encrypted with the at least one test application key 305a-n in plaintext.

Moreover, the provisioning method 200 in the test provisioning stage comprises a further step of testing a security function of the electronic device 170 using at least a portion of the first provisioning data set 150, such as the plaintext and/or wrapped test application key 305a-n.

As already mentioned above, FIGS. 4a and 4b illustrate further steps of the method 200 during the production provisioning stage, namely the generation of keys and the provisioning of the electronic device 170 during a production provisioning stage of the provisioning method 200 according to an embodiment.

As illustrated in FIG. 4b, in the production provisioning stage the method 200 may further comprise a step of generating at least one application key 405a in plaintext and encrypting, i.e., wrapping the at least one application key 405a using a second wrapping key 401 (referred to as "vendor wrapping key" in FIG. 4b) for generating at least one encrypted, i.e., wrapped application key. As illustrated in FIG. 4a, in the production provisioning stage the method 200 may further comprise a step of encrypting, i.e., wrapping the second wrapping key 401 using the secret device master key 303 for generating an encrypted, i.e., wrapped second wrapping key 401'. This wrapping of the second wrapping key 401 using the secret device master key 303 may be provided by the wrapping service 302 of the manufacturer of the electronic device 170, i.e., the silicon vendor. As illustrated in FIG. 4b, in the production provisioning stage the method 200 may further comprise a step of provisioning the electronic device 170 with a second provisioning data set 150', wherein the second provisioning data set 150' comprises the at least one encrypted, i.e., wrapped application key 405a' and the encrypted, i.e., wrapped second wrapping key 401'.

As illustrated in FIG. 4b, the encrypted, i.e., wrapped application key 405a' and the encrypted, i.e., wrapped second wrapping key 401' may be provided to and/or stored within the hardware security enclave 170a of the electronic device 170. Within the hardware security enclave 170a of the electronic device 170 a key recovery algorithm 304 may be configured to unwrap the wrapped second wrapping key 401' based on the secret device master key 303 for obtaining the plaintext second wrapping key 401, which may be further used to unwrap, i.e. decrypt the least one encrypted, i.e. wrapped application key 405a' for obtaining the plaintext application key 405a. In an embodiment, the method further comprises storing the at least one plaintext application key 405a in the hardware security enclave 170a of the electronic device 170. In an embodiment, the method may further comprise decrypting further data of the second provisioning data set 150' using the at least one plaintext application key 405a.

In an embodiment, the at least one test application key 305a-n has a first key entropy and the at least one application key 405a has a second key entropy, wherein the first key entropy is substantially, e.g., by many orders of magnitude smaller than the second key entropy.

In an embodiment, the at least one test application key 305a-n has a first key size, i.e., key length and the at least one application key 405a has a second key size, i.e., key length, wherein the first key size is equal to the second key size.

In an embodiment, the method 200 comprises, in the test provisioning stage, generating the at least one test application key 305a-n in plaintext based on a key generation mechanism and, in the production provisioning stage, generating the at least one application key 405 based on the same key generation mechanism. Thus, in an embodiment, the method 200 may generate the test application key 305a-n in the test provisioning stage and the application key 405a in the production provisioning stage using the same key generation mechanism for ensuring, for instance, that the keys have the same key size.

In an embodiment, the method 200 comprises, in the test provisioning stage, generating the at least one test application key 305a-n using a first set of random numbers or random seed numbers and, in the production provisioning stage, generating the at least one application key 405 using a second set of random number or random seed numbers, wherein the entropy of the first set of random numbers or random seed numbers is smaller than the entropy of the second set of random numbers or random seed numbers.

In an embodiment, the second set of random numbers or random seed numbers comprises substantially more random numbers or random seed numbers than the first set of random numbers. In the case of the test application key 305a-n used during the test provisioning stage, the first set of random numbers or random seed numbers may be used to choose a key value from a set of predetermined key values which are fixed. Here, the randomness comes from randomly choosing a fixed key value from a set of maybe 16 numbers. Alternatively, for some applications there may only be a single, fixed number of keys defined. In the case of the application key 405a used during the production provisioning stage the second set of random numbers may be random numbers for the entire key. In this case, there could be up to 2 to the power 256 possible random numbers, i.e., much more than only 16 numbers.

By way of example, in an embodiment, in the test provisioning stage a reduced set of numbers may be used as the source for a key generation mechanism. In an embodiment, rather than using a small set of "random" numbers, the numbers may be chosen such that they do not appear very random at all. By way of example, the following "random numbers" may be used for generating the weakened test application key 305a-n in the test provisioning stage:

0x1111111111111111111111111111111111111111111111111111

0x2222222222222222222222222222222222222222222222222222

. . . .

Thus, in an embodiment, the method 200 may implement the following scheme in the test provisioning stage for generating the weakened test application key 305a-n.

1. When generating the respective test application key 305a-n, the "random number" source may be chosen from a reduced set (such as a set of 16, 64, 128 or 256 numbers).
2. The number sources for the respective keys are chosen to look not random at all, e.g., all the bytes in the number may each be set to the same value (0x11 11 . . . , 0x2222 . . . etc.). These simple number sequences hence values of random numbers could be made publicly available.

In an embodiment, the first wrapping key 301 (used for wrapping the at least one application test key 305 a-n for the test provisioning stage) and the second wrapping key 401 (used for wrapping the at least one application key 405 for the production provisioning stage) have the same or substantially the same key entropy. In an embodiment, the first wrapping key 301 has the same key bit length as the second wrapping key 401.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application.

Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g.," are merely meant as an example, rather than the best or optimal. The terms "coupled" and "connected", along with derivatives may have been used. It should be understood that these terms may have been used to indicate that two elements cooperate or interact with each other regardless of whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

The invention claimed is:

1. A method for provisioning a plurality of electronic devices with a respective provisioning data set, wherein each of the plurality of electronic devices comprises a hardware security enclave providing a secret device master key, wherein the method comprises in a test provisioning stage:
generating at least one test application key in plaintext and encrypting the at least one test application key using a first wrapping key for generating at least one encrypted test application key;
encrypting the first wrapping key using the secret device master key for generating an encrypted first wrapping key;
provisioning at least one of the plurality of electronic devices with a respective first provisioning data set, wherein the respective first provisioning data set comprises the at least one test application key in plaintext, the at least one encrypted test application key and the encrypted first wrapping key; and
testing a security function of the electronic device on the basis of at least a portion of the first provisioning data set;
wherein in a production provisioning stage the method further comprises:
generating at least one application key in plaintext and encrypting the at least one application key using a second wrapping key for generating at least one encrypted application key, wherein the first wrapping key and the second wrapping key have the same key entropy;
encrypting the second wrapping key using the secret device master key for generating an encrypted second wrapping key; and
provisioning one or more of the plurality of electronic devices with a respective second provisioning data set, wherein the respective second provisioning data set comprises the at least one encrypted application key and the encrypted second wrapping key.

2. The method of claim 1, wherein the first provisioning data set further comprises data encrypted with the at least one test application key.

3. The method of claim 1, wherein the at least one test application key has a first key entropy and the at least one application key has a second key entropy and wherein the first key entropy is smaller than the second key entropy.

4. The method of claim 1, wherein the at least one test application key has a first key size and the at least one application key has a second key size, wherein the first key size is equal to the second key size.

5. The method of claim 4, wherein the method comprises, in the test provisioning stage, generating the at least one test application key using a first set of random seed numbers and, in the production provisioning stage, generating the at least one application key using a second set of random seed numbers, wherein the entropy of the first set of random numbers is smaller than the entropy of the second set of random numbers.

6. The method of claim 5, wherein the second set of random numbers comprises more random numbers than the first set of random numbers.

7. The method of claim 1, wherein the method comprises, in the test provisioning stage, generating the at least one test application key in plaintext based on a key generation mechanism and, in the production provisioning stage, generating the at least one application key based on the key generation mechanism.

8. The method of claim 1, further comprising the step of decrypting the encrypted second wrapping key on the basis of the device master key and the step of decrypting the at least one encrypted application key using the second wrapping key for retrieving the at least one application key.

9. The method of claim 8, further comprising storing the at least one application key in the hardware security enclave of the electronic device.

10. The method of claim 1, wherein the method further comprises, in the production provisioning stage, transmitting the respective second provisioning data set from a production provisioning control apparatus to a production provisioning equipment server.

11. The method of claim 10, wherein the method comprises, in the production provisioning stage, transmitting the respective provisioning data set towards the provisioning equipment server via a wired connection.

12. The method according to claim 1, wherein the first wrapping key has the same length as the second wrapping key.

13. A method for provisioning a plurality of electronic devices with a respective provisioning data set, wherein each of the plurality of electronic devices comprises a hardware security enclave providing a secret device master key, wherein the method comprises in a test provisioning stage:
generating at least one test application key in plaintext and encrypting the at least one test application key using a first wrapping key for generating at least one encrypted test application key;
encrypting the first wrapping key using the secret device master key for generating an encrypted first wrapping key;
provisioning at least one of the plurality of electronic devices with a respective first provisioning data set, wherein the respective first provisioning data set comprises the at least one test application key in plaintext, the at least one encrypted test application key and the encrypted first wrapping key; and
testing a security function of the electronic device on the basis of at least a portion of the first provisioning data set;
wherein in a production provisioning stage the method further comprises:
generating at least one application key in plaintext and encrypting the at least one application key using a second wrapping key for generating at least one encrypted application key, wherein the first wrapping key has the same length as the second wrapping key;
encrypting the second wrapping key using the secret device master key for generating an encrypted second wrapping key; and
provisioning one or more of the plurality of electronic devices with a respective second provisioning data set, wherein the respective second provisioning data set comprises the at least one encrypted application key and the encrypted second wrapping key.

14. A system provisioning a plurality of electronic devices with a respective provisioning data set, wherein each of the plurality of electronic devices comprises a hardware security enclave providing a secret device master key, the system comprising:
a production provisioning control apparatus; and
a production provisioning equipment server;

wherein the production provisioning control apparatus comprising a processor:
  generates at least one test application key in plaintext and encrypting the at least one test application key using a first wrapping key for generating at least one encrypted test application key;
  encrypts the first wrapping key using the secret device master key for generating an encrypted first wrapping key;
  provisions at least one of the plurality of electronic devices with a respective first provisioning data set, wherein the respective first provisioning data set comprises the at least one test application key in plaintext, the at least one encrypted test application key and the encrypted first wrapping key; and
  tests a security function of the electronic device on the basis of at least a portion of the first provisioning data set;
wherein the production provisioning equipment server:
  generates at least one application key in plaintext and encrypting the at least one application key using a second wrapping key for generating at least one encrypted application key, wherein the first wrapping key and the second wrapping key have the same key entropy or wherein the first wrapping key has the same length as the second wrapping key;
  encrypts the second wrapping key using the secret device master key for generating an encrypted second wrapping key; and
  provisions one or more of the plurality of electronic devices with a respective second provisioning data set, wherein the respective second provisioning data set comprises the at least one encrypted application key and the encrypted second wrapping key.

15. The provisioning system according to claim 14, wherein the first wrapping key and the second wrapping key have the same key entropy.

16. The provisioning system according to claim 14, wherein the first wrapping key has the same length as the second wrapping key.

17. The provisioning system according to claim 14, wherein the production provisioning control apparatus and the production provisioning equipment server are electrically connectable with the plurality of electronic devices.

18. The provisioning system according to claim 14, wherein the production provisioning control apparatus is coupled to the production provisioning equipment server.

19. The provisioning system according to claim 14, wherein the first provisioning data set further comprises data encrypted with the at least one test application key.

20. The provisioning system according to claim 14, wherein the production provisioning control apparatus is configured to transmit the respective second provisioning data set to the production provisioning equipment server.

\* \* \* \* \*